July 26, 1955
L. SOLOMON
2,713,886
TOY STEERING WHEEL AND SEAT
Filed Feb. 25, 1953
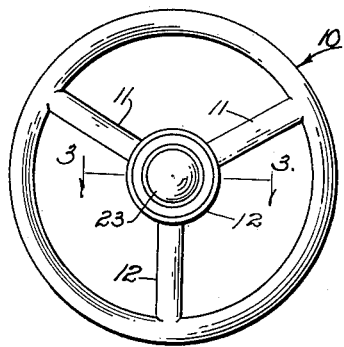
Fig.1.
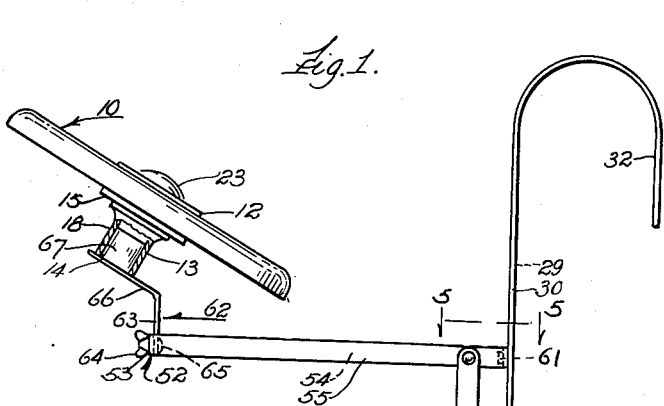
Fig.2.
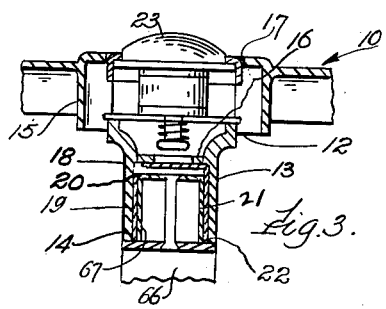
Fig.3.
Fig.4.
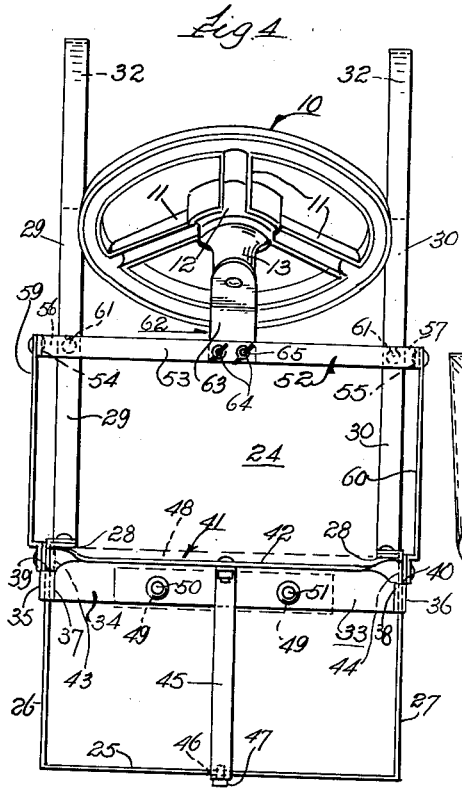
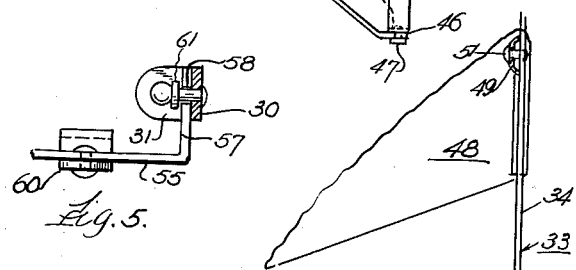
Fig.5.
Fig.7.
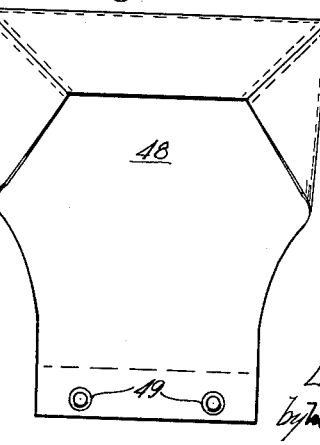
Fig.6.
Inventor.
Louis Solomon.
by Knight and Comstock
Attorneys.

United States Patent Office 2,713,886
Patented July 26, 1955

2,713,886

TOY STEERING WHEEL AND SEAT

Louis Solomon, Chicago, Ill.

Application February 25, 1953, Serial No. 338,647

2 Claims. (Cl. 155—11)

Among the objects of my invention is to provide a toy removably attachable to the seat of an automobile providing an elevated safe seat for a child and a wheel to simulate the steering of the automobile, without danger to the car or the user of the toy.

A child greatly enjoys imitating the movements of his father in driving an automobile. It is always a great temptation for the child to take hold of the steering wheel and thus possibly cause injury and damage. With my device the child may copy the movements of his father or other driver in both steering the car and in shifting of the gears. This will satisfy the child's desire for play, and at the same time afford him instruction, to some degree, in driving.

My toy seat provides a safe restraining means for the child while at the same time supplying a comfortable seat and diverting entertainment.

My invention also contemplates such other objects, advantages and capabilities which will later more fully appear, and which are inherently possessed by my invention.

While I have shown in the attached drawings a preferred embodiment of my invention, yet it is to be understood that the same is susceptible of modification and change without departing from the spirit of my invention.

Referring more particularly to the drawings, Fig. 1 is a side elevational view of my device; Fig. 2 is a face view of the wheel; Fig. 3 is an enlarged detailed sectional view on line 3—3 of Fig. 2; Fig. 4 is a front elevational view; Fig. 5 is a detailed fragmental view on line 5—5 of Fig. 1; Fig. 6 is a detailed fragmental view on line 6—6 of Fig. 1 and Fig. 7 is a bottom plan view of the seat fabric.

Referring more now to the embodiments selected to illustrate my invention, I provide a steering wheel 10, circular in shape and having spaced spokes 11. The hub 12 has a lower reduced portion 13 with an open bottom 14.

Hub 12, preferably made of plastic, is hollow with side walls 15, a bottom floor 16 and an open top 17. Lower portion 13 which is integral with hub 12 has closed side walls 18, a closed top which is the underside of bottom floor 16 of hub 12, and open bottom 14. A metal fitting 19 has a closed top 20, closed side walls 21 and an open bottom 22 and is of such a size as to be pressed into lower portion 13 and remain in contact therewith, with its top 20 contacting the under surface of floor 16 and its side walls 21 in friction grip with side walls 18 of lower portion 13. A cap 23 closes open top 17 of hub 12.

My seat 24 has a bottom rail 25 with integral spaced upright portions 26 and 27, each ending in a short inwardly extending portion 28.

A pair of spaced upwardly extending arms 29 and 30 each has a short forwardly extending portion 31 at its lower end. Each of said portions 31 is positioned against the underside of a corresponding portion 28 and pivotally attached thereto. Each of arms 29 and 30 has at its upper end an outwardly and downwardly curved hook portion 32.

A wide reinforcing strap 33 has a rear portion 34 which extends between upright portions 26 and 27. Strap 33 is bent at a right angle and is attached at its side portions 35 and 36 to portions 26 and 27. At its ends strap 33 has inwardly extending portions 37 and 38 which are cut away to form stops 39 and 40.

A seat support 41 has a central horizontal portion 42 and integral spaced side portions 43 and 44, the inner ends of which are pivotally attached to sides 35 and 36 of strap 33, directly above stops 39 and 40, so that in downward position sides 43 and 44 rest on stops 39 and 40. A bracket 45 is swingably attached at its upper end to the central part of portion 42 and has a slot 46 at its lower end to removably engage button 47 attached to the central bottom portion of rail 25.

A cover 48 of fabric, leather or other suitable material has a short doubled under front portion for engaging and covering front portion 42 of seat support 41. The cover extends rearwardly, covering side portions 43 and 44, and the back of strap 33 on which it is doubled forward with spaced eyelets 49 removably engaging nubs 50 and 51 in the front wall of strap 33.

A guard rail 52 has a front portion 53, integral spaced side portions 54 and 55 and short inwardly extending end portions 56 and 57, each with a slot 58. A bracket 59 is pivotally attached at its lower end to side portion 35 of strap 33 and at its upper end is pivotally attached to side portion 54 of guard rail 52. Another bracket 60 is pivotally attached at its lower end to side portion 36 of strap 33 and at its upper end is pivotally attached to side portion 55 of guard rail 52. Guard rail 52 may be swung toward arms 29 and 30 so that slots 58 may removably engage buttons 61 attached to arms 29 and 30.

A mounting 62 has an upwardly extending portion 63 the lower end of which is removably attached to front portion 53 of guard rail 52 with thumb nuts 64 and bolts 65, or any other suitable means. Integral with portion 63 is a forwardly extending portion 66, to which is attached rounded member 67, to removably receive the open bottom 22 of metal fitting 19 of the reduced portion 13 of hub 12, wheel 10 may be rotated on member 67.

The rail 25 may be positioned on the seat of an automobile, and the curved holding end portions 32 of arms 29 and 30 may be placed to engage the back of the seat of the automobile. The child sitting on the seat is elevated for perfect vision, and may operate the wheel to simulate the driver of the car.

Suitable straps may be provided for the seat for further holding the child in position thereon.

In packing my device for shipment or storage when not in use wheel 10 may be removed from member 66; cover 48 may be removed; the seat support may be disengaged from button 47 and pivoted upwardly; guard rail 52 may be disengaged from buttons 61 and pivoted upwardly along with brackets 59 and 60 and arms 29 and 30 may be pivoted inwardly. This provides a very compact arrangement.

Having thus described my invention, I claim:

1. A toy comprising a seat frame, a bottom rail attached to said frame, a cover attached to said frame forming a child's seat, a pair of upright arms attached to said frame and adapted to removably engage the back of an automobile seat and said bottom rail adapted to rest on the automobile seat, a guard rail pivotally attached to said frame and removably attached to said arms and a wheel rotatably and removably attached to said guard rail.

2. A toy comprising a frame having a bottom rail adapted to rest on the seat of an automobile, a pair of uprights pivotally attached to said frame and adapted to engage the back of the automobile seat, a strap attached to said frame, a seat support pivotally attached to said strap and removably attached to said rail, a cover attached to said seat support, a guard rail pivotally attached to said strap, and removably attached to said uprights, a mounting removably attached to said guard rail, and a wheel removably and rotatably attached to said mounting.

References Cited in the file of this patent

UNITED STATES PATENTS

| | | |
|---|---|---|
| D. 167,287 | Smith | July 15, 1952 |
| 1,209,586 | Jensen | Dec. 19, 1916 |
| 1,750,435 | Silver | Mar. 11, 1930 |
| 1,987,385 | Back | Jan. 8, 1935 |
| 2,322,403 | Van Der Kieft | June 22, 1943 |
| 2,522,205 | Anderson | Sept. 12, 1950 |
| 2,533,527 | Soltis | Dec. 12, 1950 |
| 2,585,721 | Bachand | Feb. 12, 1952 |